(No Model.)
D. C. WILGUS.
PIPE AND HOSE COUPLING.
No. 553,089. Patented Jan. 14, 1896.
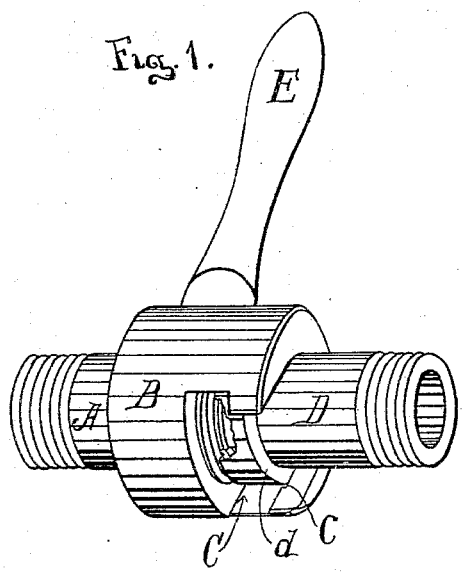
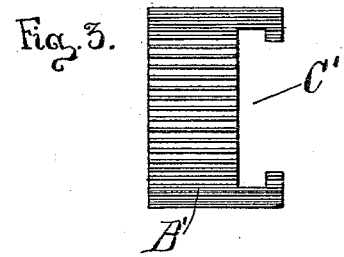
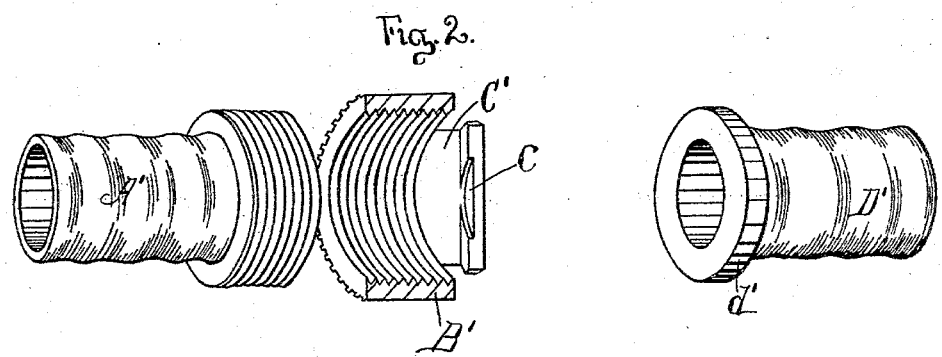
Witnesses.
P. W. Harbeson.
Alfred I. Townsend.
Inventor.
D. C. Wilgus
by Hazard Townsend
his atty

UNITED STATES PATENT OFFICE.

DANIEL C. WILGUS, OF LOS ANGELES, CALIFORNIA.

PIPE AND HOSE COUPLING.

SPECIFICATION forming part of Letters Patent No. 553,089, dated January 14, 1896.

Application filed May 20, 1893. Serial No. 474,878. (No model.)

*To all whom it may concern:*

Be it known that I, DANIEL C. WILGUS, a citizen of the United States, residing at Los Angeles, in the county of Los Angeles and State of California, have invented a new and useful Improvement in Pipe and Hose Couplings, of which the following is a specification.

My invention relates particularly to that class of couplings in which one end of a sleeve is screwed upon a screw-threaded coupling member and has its other end provided with a side opening adapted to allow the sidewise insertion of the flanged end of the other member of the coupling into the sleeve. Heretofore in couplings of this class the seat for retaining the flanged member of the coupling within the sleeve has consisted of an annular groove provided in the end of the screw-threaded member of the coupling, so that when the parts are being coupled, in order to seat the flanged member in position within the grooved seat, the two members must be forced toward each other and hold while the sleeve is rotated to draw the members together. In practical operation, when the flanged member is inserted into the sleeve, the operator will naturally pull the flanged member outward against the retaining-flange of the sleeve and away from its seat within the end of the screw-threaded member, and when the sleeve is tightened, without excessive care upon the part of the operator, it frequently occurs that the flanged member is not properly seated in the grooved seat in the end of the screw-threaded member, and an imperfect joint is formed.

The object of my invention is to provide a coupling of this class which will be more convenient in use, and one in which the flanged member will be accurately centered and held axially in line with the screw-threaded member of the coupling while the sleeve is being rotated to draw the members together.

A further object of my invention is to provide a coupling of this class which will be suitable for oil or other joints upon which considerable pressure must be exerted in order to form a tight joint, and one in which the lever for tightening the coupling forms a part of the coupling, thus dispensing with the use of a wrench, which oftentimes is not at hand when needed.

The accompanying drawings illustrate my invention.

Figure 1 is a perspective side elevation of my invention applied to an oil-joint. Fig. 2 is a perspective view of my improved coupling adapted to be applied to a hose. The coupling-sleeve is shown in section to expose the recessed flange-seat. Fig. 3 is a plain side elevation of the locking-sleeve shown in section in Fig. 2.

In the drawings, Fig. 1 illustrates an oil-coupling consisting of a screw-threaded member A, a coupling-sleeve B screw-threaded at one end and screwed upon the screw member A and provided in its other end with a side opening C adapted to receive the flanged end $d$ of the flanged member D of the coupling. E is a coupling-lever which is cast integral with the sleeve B and serves as convenient means for tightening the oil-joint upon which considerable force must be exerted in order to make a tight joint. Within this side opening C is provided a recessed flange-seat $c$ arranged presented toward the end of the screw-threaded member and adapted to receive and seat the flange $d$ of the flanged member when the screw-threaded member A is screwed into the sleeve to force the flange outward, as shown in said Fig. 1.

In Figs. 2 and 3 is illustrated my invention adapted to be applied to a hose-coupling. $A'$ represents the screw-threaded member. $B'$ represents the sleeve, screw-threaded at one end and provided at its other end with the side opening $C'$, which in this form extends entirely through the sleeve and allows the introduction of the flanged member from either side of the sleeve. $c'$ represents the recessed flange-seat. $d'$ represents the flange, and $D'$ is the flanged member.

In practice the screw-threaded member A $(A')$ is unscrewed a sufficient distance from the sleeve B $(B')$ to remove it from the path of the flanged member D $(D')$. Then the flange $d$ $(d')$ of the flanged member D $(D')$ is inserted through the side opening C $(C')$ into its recessed seat $c$ $(c')$ in the sleeve, the recessed seat serving as an accurate guide to hold the two members A $(A')$ D $(D')$ axially in line with each other. Then the screw-threaded member $A'$ is screwed into the sleeve until it presses against the flanged member D $(D')$ and forces it firmly into its seat. When any sidewise strain is brought to bear upon the coupling, the flange $d\,(d')$ will engage with the walls of the recessed seat $c\,(c')$ and prevent displacement of the flange from the sleeve. By arranging the flange-seat opening presented toward the screw-threaded member of the coupling such seat is thoroughly protected and cannot be accidentally injured.

Now, having described my invention, what I claim as new, and desire to secure by Letters Patent, is—

1. In a hose coupling the combination of the screw threaded member, the sleeve screwed upon such screw threaded member and provided in one end with a side opening and with a recessed flange seat arranged presented toward the screw threaded member and adapted to receive and seat the flanged end of the other member of the coupling, and such other member of the coupling provided with the flange adapted to enter the side opening of the sleeve and to seat within the recessed flange seat in the sleeve.

2. In a hose coupling, the combination of the screw threaded member, the sleeve screwed upon such screw threaded member and provided in one end with a side opening and a recessed flange seat and provided with a tightening lever cast integral therewith and projecting therefrom, and the flanged member of the coupling provided with a flange adapted to enter the side opening of the sleeve and to seat within such sleeve.

DANIEL C. WILGUS.

Witnesses:
ALFRED I. TOWNSEND,
F. M. TOWNSEND.